July 7, 1953 G. L. HAZEN 2,644,425
SWINE FEEDER

Filed July 14, 1951 2 Sheets-Sheet 1

INVENTOR.
GRETZOLON L. HAZEN
BY *A.S.Krob*
ATTORNEY

July 7, 1953

G. L. HAZEN 2,644,425

SWINE FEEDER

Filed July 14, 1951

INVENTOR.
GRETZOLON L. HAZEN
BY ASKroh
ATTORNEY

Patented July 7, 1953

2,644,425

UNITED STATES PATENT OFFICE 2,644,425

SWINE FEEDER

Gretzolon L. Hazen, Fort Atkinson, Wis., assignor to James Manufacturing Company, Fort Atkinson, Wis.

Application July 14, 1951, Serial No. 236,789

3 Claims. (Cl. 119—53.5)

The present invention relates generally to a ground mixture feeder for swine, wherein the animals use their snouts for agitating the mixture in the container and delivering it into a circular feeding trough.

In designing my feeder I have taken advantage of an inherent trait in hogs to use their snouts in various ways while feeding.

An object of the present invention is to interest the animals in a manner which provides the necessary mechanical movement required to convey the feed into the trough from a large container and provide room for a large number of hogs thus to economize in space and cost of the complete feeder and requiring minimum attendant service.

To these and other useful ends my invention consists of parts, combinations of parts, or their equivalents and mode of operation as hereinafter described and claimed and shown in the accompanying drawings in which:

Figure 1:
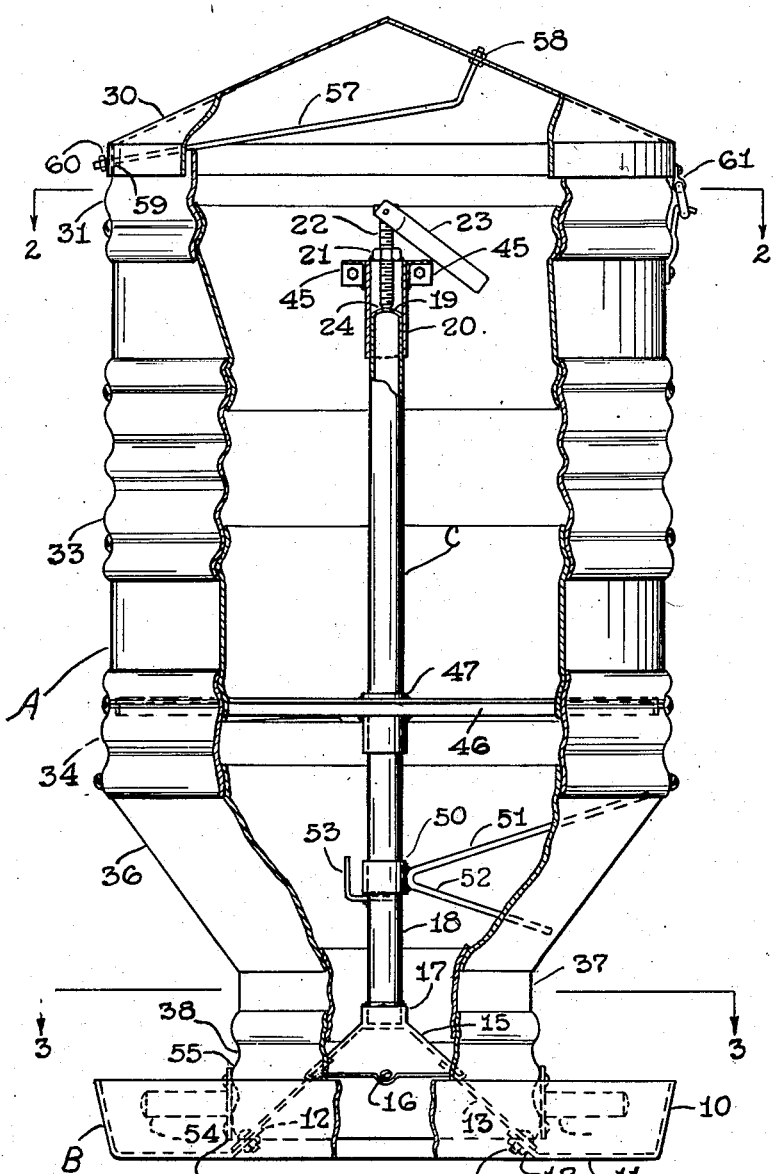
Fig. 1 is a vertical side elevational view of my device, a part being cut away in order to clearly illustrate some of the internal operating parts of the device.
Figure 2:
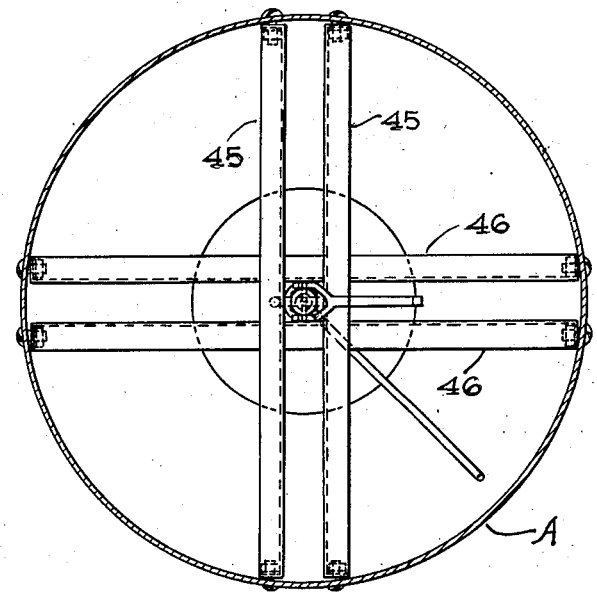
Fig. 2 is a transverse sectional view of the device taken on lines 2—2 of Figure 1.
Figure 3:
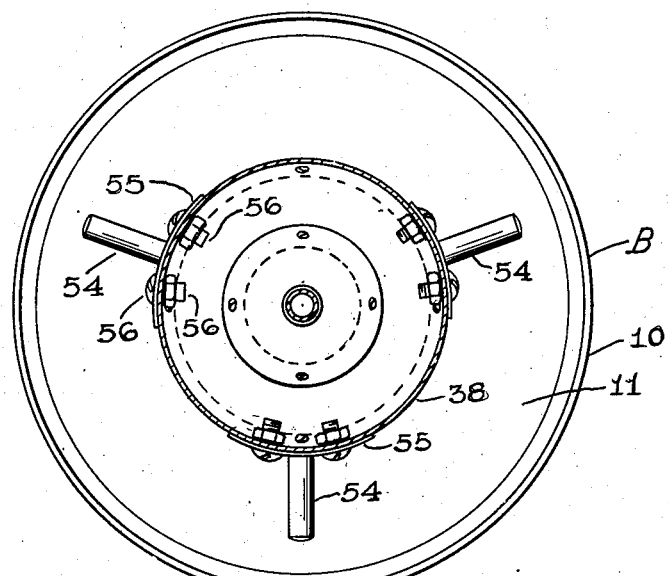
Fig. 3 is a transverse sectional view of the device taken on lines 3—3 of Figure 1.

In Figure 1 part of several elements are shown by dotted and full lines. Other parts are shown by dotted lines only.

As thus illustrated the container in its entirety is designated by reference character A. The annular feeder trough is designated by reference character B and the agitating and stabilizing means is designated by reference character C.

I have, for purposes which will hereinafter appear, reversed the common practice by making the agitating means stationary and revolving member A, so the action of the feeding mechanism is substantially equivalent, perhaps superior to the operation of feeding the material by turning the agitating means within the container.

Annular trough B has an outer flange 10, a bottom 11 and an inner flange 12, thus forming the trough around which the animals may congregate for feeding. A frustum of a cone shaped member 13 is secured to flange 12 as illustrated, preferably by means of bolts 14. Another frustum of a cone shaped member 15 is fitted over the upper end of member 13 as illustrated and secured thereto preferably by means of bolts as at 16. The upper end of cone 15 has a flange 17 into which a tube 18 is preferably firmly screwthreaded. The upper end of tube 18 is provided with a cap 19 either by welding or otherwise. A tube 20, having a considerable length is rotatably mounted on the upper end of tube 18. Tube 20 is anchored to member A as will hereinafter appear. Tube 20 has secured to its upper end a nut 21 in which a bolt 22 is screwthreaded. The lower end of this bolt rests on cap 19 and the upper end is provided with a transversely hinged lever 23. Thus the weight of member A will be carried by bolt 22 and the vertical position of member A will be determined by this bolt as at 24.

Member A consists preferably of a lid 30 and a number of sections, 31, 33, 34, a cone shaped section 36, an extension 37 and another extension 38, each being suitably secured together in the order given either by bolts or otherwise. Member 38 terminates as at 39 which may be held at different distances from the bottom 11 of annular feed trough or pan B by adjusting screwthreaded bolt 22. When this adjustment is once made it cannot change accidentally because the free end of lever 23 extends below anchor bars 45—45. These anchor bars are rigidly secured to tube 20 and to section 31. Other anchor bars 46—46 are preferably secured to section 33 and to a sleeve 47 which is rotatably mounted on tube 18. Thus member A and its rigidly connected parts will be held concentric with member B and tube 18 and is free to revolve in either direction an unlimited distance on this tube.

It will be seen that member 38, revolving as it does and its bottom being a short distance from member 11, will act as a metering valve to agitate and cause the feed to flow into pan B in quantities determined by the distance between 39 and 11 and by the movements of member A. I provide other means for agitating the feed in member A so it will not clog but will be positively fed downwardly between cones 13 and 15 and members 36, 37 and 38 as follows:

A sleeve 50 is rotatably mounted on tube 18 and having preferably fingers 51 and 52 secured thereto, the outer ends of which terminate near the inner walls of members 34 and 36.

I secure a stop bracket 53 to tube 18 on which tube 50 freely rests; thus when container A revolves, members 51 and 52 will be moved by the feed until these members contact stop member 53. This contact will slightly vibrate tube 18 and because these members then will be stationary, they will help move the feed downwardly. Sooner or later member A will be moved, in the other direction until members 51 and 52, to some extent again violently contact the other side of member 53.

I provide means whereby the feeding animals will move member A back and forth by providing a number of projections 54 (preferably 3). The animals when feeding will snout members 54 back and forth and turn member A back and forth, causing members 51 and 52 to frequently contact member 53 and move through the turning feed while standing.

Thus I provide a swine feeder which is operated intuitively by the animals and wherein a convenient means is provided for regulating the flow of feed into the trough. Members 54 are secured to member 38 by means of plates 55 which are preferably secured to member 54 by electric weld. Members 55 are secured to member 38 by means preferably of two bolts 56. Member 38 may have a number of spaced holes whereby one or more members 54 may be attached. However I have found in practice that not more than three members 54 are needed.

I have also found that the animals do less snouting when there is a good supply of feed in trough B and if there is a scant supply of feed in trough B the animals vigorously snout members 54, thus the device operates fully automatically.

Lid 30 is provided with a bar 57 the inner end being secured to member 30 as at 58, the outer end extending freely through an opening 59 in the top of member 31 and through the flange of member 30, having preferably a nut 60 for stabilizing the position of member 57. It will be seen that opening 59 in member 31 will act as a hinge for member 30. On the other side of the flange of member 30 I provide a holding down clip 61. Thus by unlatching this clip, lid 30 may be lifted and moved rearwardly on rod 57 and hang on one side of member A for adjusting the height of this member or for adding feed to the container.

Having thus shown and described my device I claim:

1. In a swine feeder comprising in combination, an angular feed trough having secured to its inner flange an upwardly extending cone having secured to its apex an upwardly extending tube, a feed container, its open bottom extending to near the bottom of said trough and adjacent said cone, a sleeve its lower end rotatably mounted on the top of said tube and having secured thereto anchors which are secured to the inner wall of the container, said tube having a cap on its upper end, said sleeve having a closure nut secured to its upper end, a screwthreaded bolt in said nut, its lower end resting on said cap, for adjusting the height of the container, a number of outwardly extending projections secured to said container and positioned below the outer top of said trough, whereby the container will be turned in either direction by the snout of the animals while feeding, a stop secured to said tube, a distance below said first sleeve, a sleeve rotatably mounted on the tube and resting on said stop, prongs secured to said last sleeve, their free ends terminating adjacent the wall of said container, whereby the prongs when moved far enough in either direction by the feed will violently contact said stop as and for the purpose described.

2. In a swine feeder, comprising in combination, an annular feed trough having secured to its inner flange an upwardly extending cone, an upwardly extending tube secured to the apex of said cone, a feeder container, its open end bottom being reduced in diameter and terminating a short distance from the bottom of the annular feed trough and adjacent the inner flange thereof, spaced apart bearing sleeves rotatably mounted on said tube, each having secured thereto anchors with their ends secured to the feed container, the upper end of said tube having secured thereto a cap, the upper bearing sleeve extending upwardly a distance from said cap, having a closure nut secured to its upper end, a screwthreaded bolt in said nut, its lower end resting on said cap and adapted to rotatably support and vertically adjust the container, means for locking said screwthreaded bolt, the bottom of said container being extended inwardly and terminating a short distance from the bottom of said trough and near the inner periphery thereof, a number of outwardly extending projections, secured to said container near the bottom thereof, whereby the feed container may be turned in either direction by the snouts of the animals while feeding, a stop secured to near the lower end of said tube, a collar rotatably mounted on the tube and resting on the stop, prongs secured to said collar, their outer ends terminating adjacent the wall of said feed container and adapted to violently contact said stop when turned far enough in either direction.

3. In a swine feeder comprising in combination, an annular feed trough having secured to its inner flange an upwardly extending cone, an upwardly extending tube secured to the apex of said cone, an open bottom feed container, its upper portion having a uniform diameter, spaced apart bearing sleeves rotatably mounted on said tube, each having secured thereto transverse anchors with their ends secured to the feed container, the upper end of said upwardly extending tube having a cap, the upper bearing sleeve extending upwardly a distance above said cap and having a closure nut secured to its upper end, a screwthreaded bolt in said nut, its lower end resting on said cap and adapted to rotatably support and vertically adjust the container, means operatively associated with certain of said anchors for locking said screwthreaded bolt in said closure nut, the bottom of the uniform diameter portion of said feed container being a distance above the outer flange of said feed trough, said feed container being extended inwardly and downwardly for a distance and then downwardly for a distance, terminating a short distance above the bottom of said feed trough and adjacent the bottom of said cone, a number of spaced outwardly projecting members secured to said feed container a short distance above the bottom thereof, whereby room is provided for the heads of the feeding swine and whereby said feed container may be turned in either direction by the snouts of the animals while feeding, as and for the purpose specified.

GRETZOLON L. HAZEN.

References Cited in the file of this patent
UNITED STATES PATENTS

| Number | Name | Date |
|---|---|---|
| 1,350,523 | Royer | Aug. 24, 1920 |
| 1,359,158 | Dohm | Nov. 16, 1920 |
| 1,805,902 | Biel | May 19, 1931 |
| 2,158,253 | Reynolds | May 16, 1939 |
| 2,273,616 | Beatty | Feb. 17, 1942 |
| 2,309,997 | Thieman | Feb. 2, 1943 |
| 2,500,270 | Boland | Mar. 14, 1950 |
| 2,513,200 | Pax | June 27, 1950 |

FOREIGN PATENTS

| Number | Country | Date |
|---|---|---|
| 775,624 | France | Oct. 15, 1934 |